United States Patent [19]
Holmes et al.

[11] Patent Number: 5,722,153
[45] Date of Patent: Mar. 3, 1998

[54] METHOD FOR FABRICATING A SPLIT-LOOP ARMATURE COIL FOR A MOTOR

[75] Inventors: Carl Alfred Holmes, Erie; Hjalmar Albert Olson, North East, both of Pa.

[73] Assignee: General Electric Company, Schenectady, N.Y.

[21] Appl. No.: 507,768

[22] Filed: Jul. 26, 1995

Related U.S. Application Data

[60] Division of Ser. No. 232,563, Apr. 25, 1994, abandoned, which is a continuation-in-part of Ser. No. 126,811, Sep. 24, 1993, abandoned, which is a continuation of Ser. No. 751,043, Aug. 28, 1991, abandoned.

[51] Int. Cl.$^6$ ................................................. H02K 15/02
[52] U.S. Cl. ................................................................ 29/598
[58] Field of Search ............................. 29/598; 310/208, 310/45, 207, 206, 177, 201, 180, 184, 215, 179, 233, 195, 198, 260, 270, 254, 261, 264, 265, 213, 64, 65, 52, 58, 59

[56] References Cited

U.S. PATENT DOCUMENTS 565,647  8/1896  Armstrong ........................ 310/265
688,317  12/1901  Lamme .

*Primary Examiner*—Larry I. Schwartz
*Assistant Examiner*—Christopher Goins
*Attorney, Agent, or Firm*—Ann M. Agosti; Marvin Snyder

[57] ABSTRACT

A particular coil configuration for an armature coil for a motor is disclosed, wherein a single-turn armature coil is preferably comprised of eight individual parallel conductors electrically insulated from each other and arranged to have a rectangular cross-section, wherein the eight conductors are split into two groups of four conductors to form an air gap at the loop portion of the coil. This "split-loop" armature coil configuration provides a greater cooling surface area for the armature coils at a hot spot of the coil, thereby reducing the hot spot temperature and increasing the current capability of the machine. Moreover, the split-loop armature coil configuration avoids the problem of shorted turns between the individual conductors and thus increases the reliability of the machine.

6 Claims, 5 Drawing Sheets

METHOD FOR FABRICATING A SPLIT-LOOP ARMATURE COIL FOR A MOTOR

This application is a division of application Ser. No. 08/232,563, filed Apr. 25, 1994 now abandoned, which is a continuation in part of application Ser. No. 08/126,811, filed Sep. 24, 1993 (20-PR-1776), now abandoned which is a continuation of application Ser. No. 07/751043 filed Aug. 28, 1991, now abandoned.

BACKGROUND OF THE INVENTION

1. Field of the Invention

The present invention generally relates to dynamoelectric machines having a stator and a rotor. More particularly, the present invention relates to a winding configuration for an armature coil for a motor.

2. Description of the Related Art

A dynamoelectric machine is typically constructed having a stator and a rotor, either of which may include the armature windings, depending upon the type of machine. The field winding produces the magnetic flux for the machine. The armature winding is the main current-carrying winding in which the electromotive force (EMF) or counter-EMF of rotation is induced by the magnetic flux. The armature windings of DC motors are typically located in slots in the outside surfaces of the rotors, since they must operate in conjunction with the commutator. On the other hand, in most AC generators, the armature winding is interdispersed within slots on the inside surface of the stator core.

Each electrical coil, i.e., a single unit of the armature winding, whether located on the stator or the rotor, has an active middle portion which lies in the magnetic field, and loop portions and end-connections which am external to the magnetic field. The middle portion of the armature coil has two coil sides which, for DC motors, lie in the slots in the rotor. An armature coil may be a single-turn coil, or it may have a number of series turns. The windings may form a single layer—with one coil side per slot—or a multilayer—with two or more coil sides per slot. Each coil may have a single-strand conductor, or it may have several strands of individually-insulated parallel conductors electrically connected together.

Typically, all of the individual conductors of an armature coil are grouped and formed together in a single bundle. Several problems often occur when this single bundle is sharply bent to form the loop portion of the coil. In many cases, this loop portion is the hottest part of the coil, and becomes a limiting factor in the operation of high current machines. In order to reduce this "hot spot" temperature, prior art devices have been compelled to reduce the current rating of the armature coil.

Furthermore, when all the armature coil conductors are bundled together in the loop portion of the coil, the process of forming the wires into their final configuration creates pressure points which pinch the insulation between the individual conductors, often creating electrical shorts in the loop. The problem of electrical shorts is particularly troublesome for the inner electrical conductors in the loop portions, since they are often formed into a hairpin turn of 180° or more.

A need, therefore, exists for an improved armature coil configuration which addresses the above problems found in many single-turn, high-current, dynamoelectric machines.

SUMMARY OF THE INVENTION

It is a general object of the present invention to provide an improved method of manufacturing armature coils for a dynamoelectric machine having a multiconductor single-turn armature coil.

It is a further object of the present invention to provide an armature coil configuration having a decreased hot spot temperature.

Another object of the present invention is to provide an improved armature coil configuration which reduces pressure points on the armature coil insulation between the individual conductors.

These and other objects are achieved by the present invention which, briefly described, is an improved armature coil configuration for a dynamoelectric machine, particularly for DC motors wherein the armature winding is located on the rotor. The rotor has a number of armature coils disposed thereon, wherein each armature coil is comprised of a single-turn having two distal end portions, a loop end portion substantially opposite the two distal end portions, and two middle portions, each middle portion connecting the loop end portion to one of the two distal end portions, each middle portion disposed in one of the rotor slots, each single-turn coil comprised of a plurality of parallel individual conductors electrically insulated from each other at the middle portions and at the loop end portion, the parallel conductors disposed adjacent each other over the length of the middle portions such that substantially no gap exists between the individual conductors, at least some of the parallel conductors disposed apart from each other over at least a part of the loop end portion such that a gap exists between the individual conductors.

In accordance with another embodiment of the present invention, a single-turn armature polycoil is comprised of eight individual parallel conductors electrically insulated from each other and arranged to have a rectangular cross-section, wherein the eight conductors are split into two groups of four conductors to form a gap at the loop portion of the coil. The individual groups of four conductors, which in one embodiment each comprise two coils, can be taped or bound together as a single group of eight conductors at the middle portion of the armature coil which fits in a slot of the rotor. At the loop portion of the coil, the two groups of four conductors are separated such that a gap exists between the two groups at the split-loop portion. The gap is preferably an air gap. The dimension of the air gap is on the order of the width of one of the individual conductors.

This "split-loop" armature coil configuration of the present invention provides a greater cooling surface area for the armature winding at the hot spot of the coils, thereby reducing the hot spot temperature and increasing the current capability of the machine. Moreover, the split-loop armature coil configuration avoids the problem of shorted turns between the individual conductors which comprise the coils, and thus increases the reliability of the machine.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 7b is an end view of the stator coil taken in the direction of lines 7b—7b of FIG. 7a.

DETAILED DESCRIPTION OF PREFERRED EMBODIMENTS OF THE INVENTION

Figure 1:
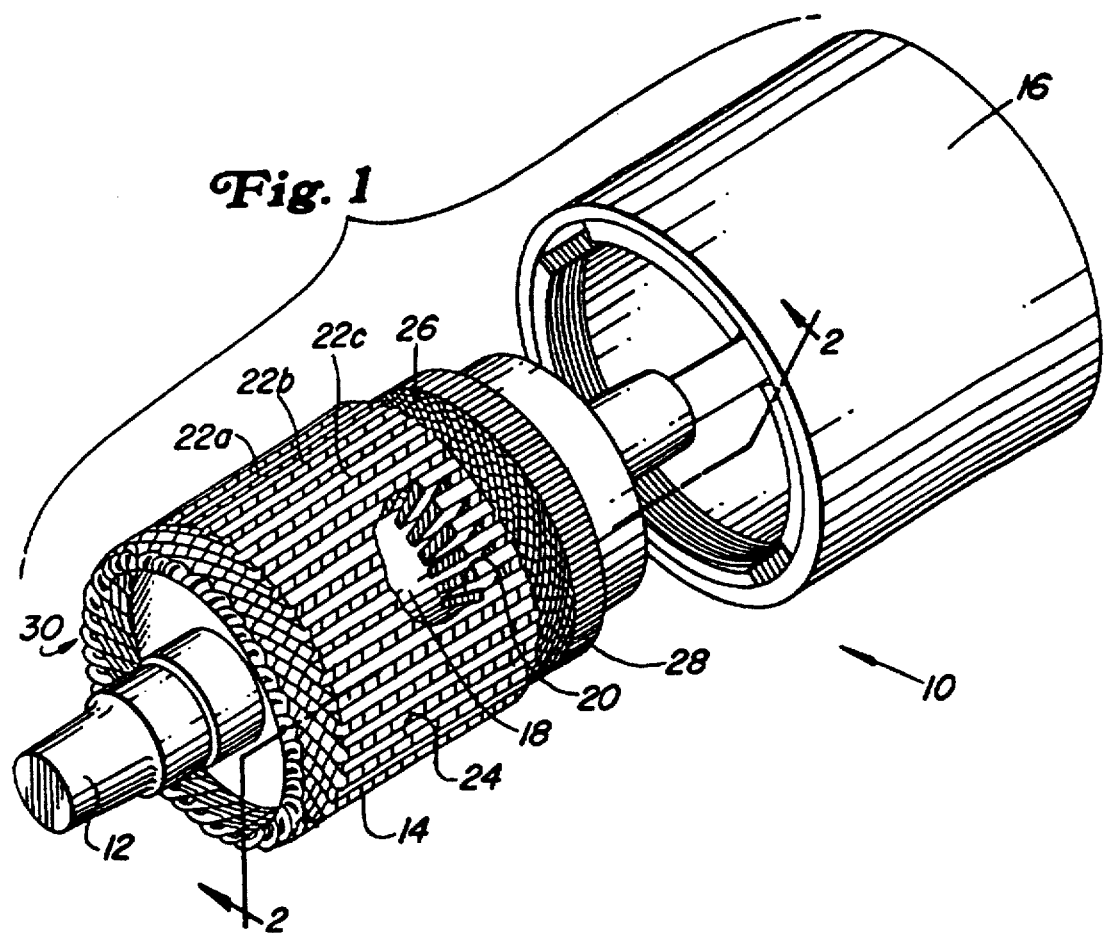
FIG. 1 is a simplified perspective view of a direct current motor for use with the present invention.

Referring now to FIG. 1, a direct current (DC) motor, generally designated as motor 10, is shown in a simplified perspective view. The DC motor includes a shaft 12, a rotor 14, and a stator 16. Since the preferred embodiment of the dynamoelectric machine is a DC traction motor for an electric locomotive, the shaft 12 would normally operate to power a load, i.e., the locomotive axle and wheels. However, if the dynamoelectric machine was a generator, then a prime mover would rotate the shaft 12 and develop electric power in the generator.

The rotor 14 comprises a magnetizable core member 18 having a plurality of axially-disposed slots 20 or receiving a plurality of armature polycoils 22 (illustrated in FIG. 1 as 22a, 22b, 22c, etc.) Single-turn armature polycoils 22 are used in the preferred embodiment. The distal ends 26 of the armature polycoils 22 extend out of the slots 20 and are electrically connected to a commutator 28. The other ends of the armature polycoils 22, i.e., the loop portions 30, also extend out of the slots of the rotor.

Each polycoil comprises a plurality of individual conductors (shown in FIG. 4) which are insulated in the slots and the loop portions. The term "polycoil" is used because, typically, predetermined ones of the individual conductors are joined at the distal ends to form individual coils. In an alternative embodiment in which all of the individual conductors are joined together at the distal ends, a single coil is formed. The present invention encompasses both polycoils and single coils.

Figure 7A:
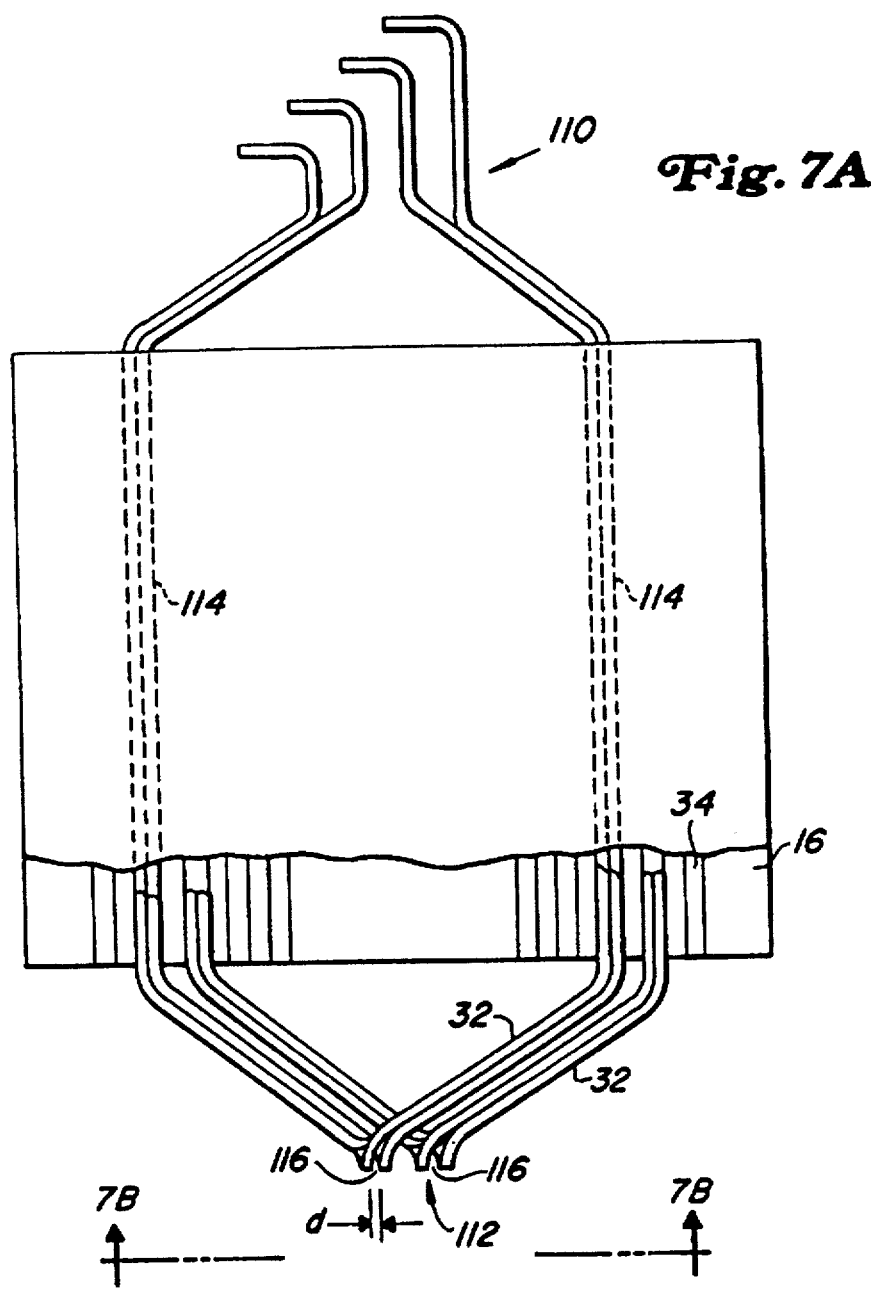
FIG. 7a is a sectional side view of the stator coil for use in an AC motor of the present invention.
Figure 7B:
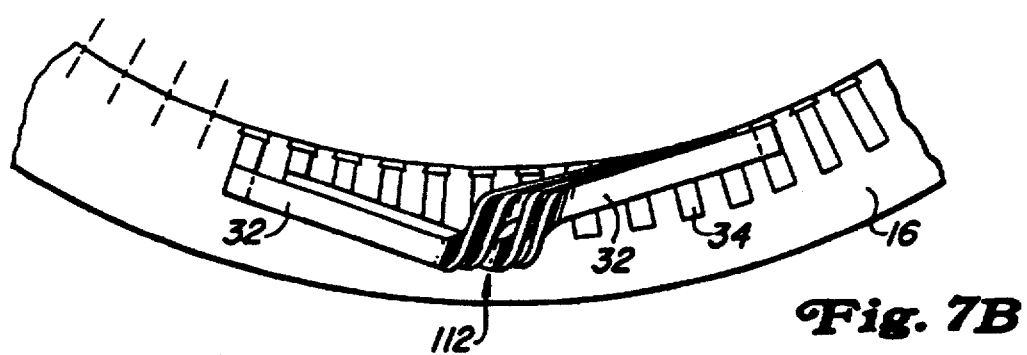

Although the preferred embodiment of the present invention is shown in FIG. 1 as a DC motor or generator having the armature winding on the rotor 14, the invention is not limited to such an embodiment. For example, in an alternating current (AC) motor or generator, the stator 16 may have armature polycoils located in stator slots disposed on the inner surface of the stator as shown in FIGS. 7a and 7b. In either type of dynamoelectric machine, the rotor windings or the stator windings can be made to exhibit the split-loop armature polycoil configuration described below. Although this description uses the term polycoil, the invention applies equally well to a single coil configuration, as discussed below.

Figure 2:
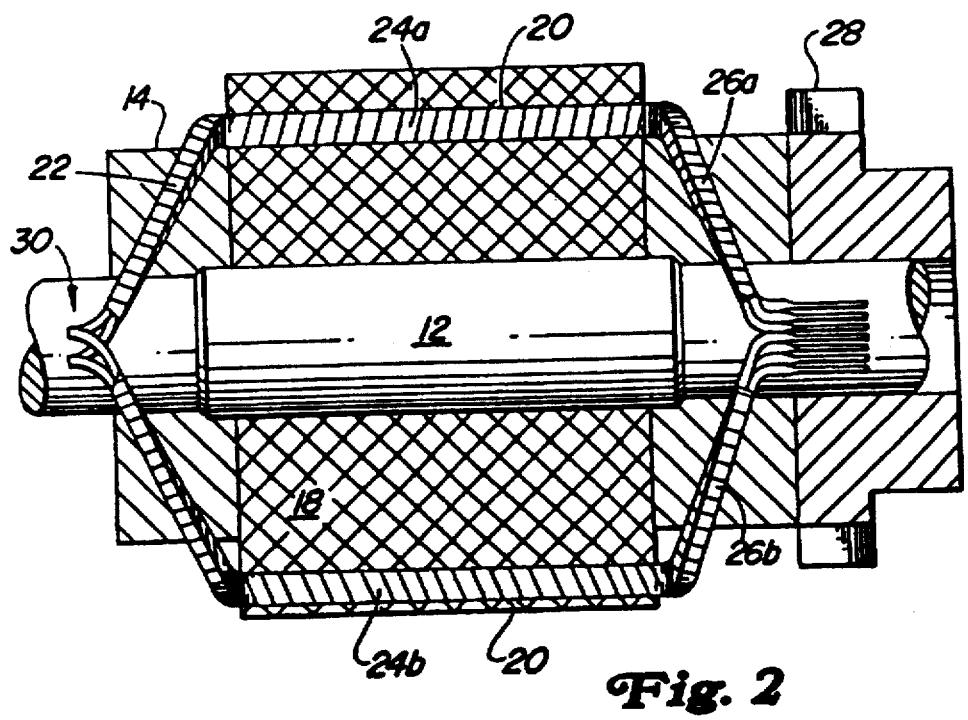
FIG. 2 is an angular cross-sectional view taken across the lines 2—2 of the rotor for the DC motor shown in FIG. 1.

FIG. 2 is an angular cross-sectional view of the rotor 14 for the DC motor 10 shown in FIG. 1. As can be seen from this cross-sectional view, the single turn armature polycoil 22 has a loop portion 30 extending over the edge of the magnetic core member 18 of the rotor 14, two side portions 24a and 24b, each disposed below the surface of the rotor 14 in its individual core slots 20, and two distal ends 26a and 26b, each electrically connected to the commutator 28. Each side portion 24a and 24b of polycoil 22 is disposed in a respective one of the slots.

Depending upon the desired winding configuration for the motor 10, a particular armature polycoil will not lie in a planar cross section of the rotor, i.e., the side portions 24a and 24b of a particular armature polycoil will not be 180° apart on the core member 18. The rotor slots 20 and the side portions 24a and 24b would lie approximately a slot pitch apart, wherein the pitch is less than 180 electrical degrees. The slot pitch of the polycoil is found by taking the quotient of the total number of slots in the core to the number of poles and rounding down to a whole number. In the preferred embodiment, 46 core slots on a 4-pole machine results in 11.5 or 11 for the slot pitch, such that the side portions 24a and 24b lie approximately 86 mechanical degrees apart.

Figure 3:
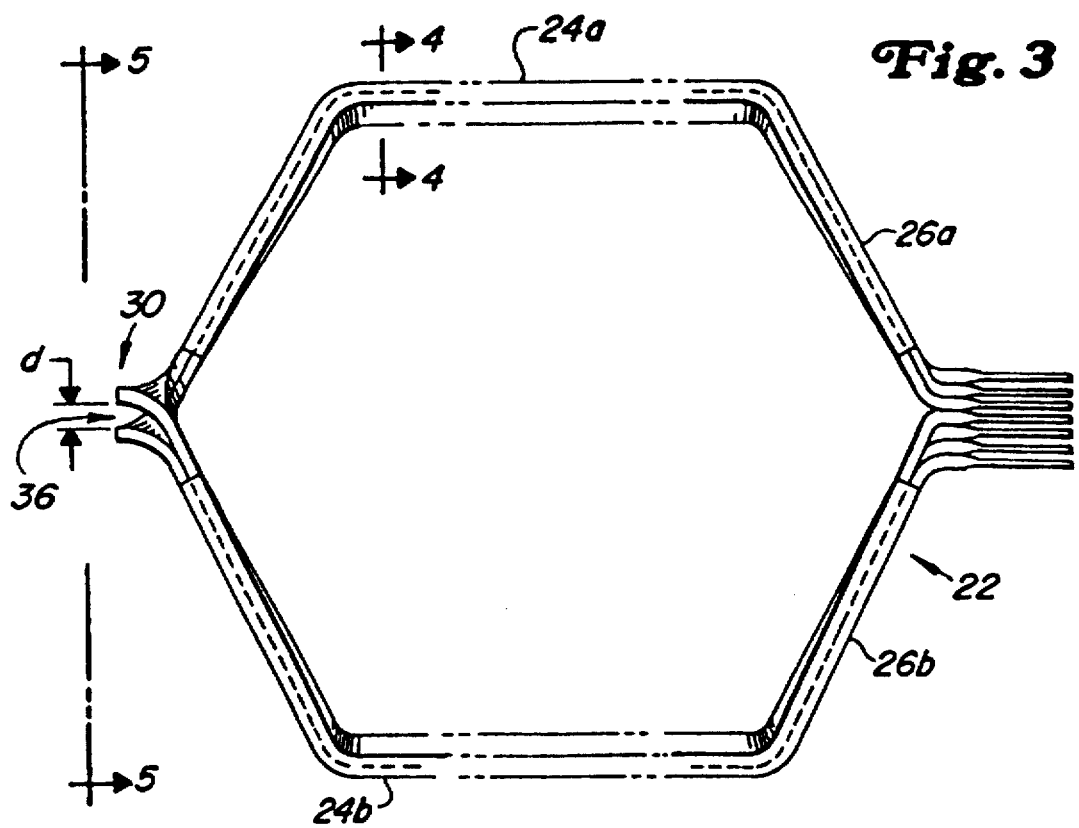
FIG. 3 is a side view of the preferred armature coil configuration of the present invention.

FIG. 3 is a side view of the preferred armature polycoil configuration of the present invention. Again note that FIG. 3 does not represent a planar cross-section of the rotor, i.e., the side portions 24a and 24b of the armature polycoil 22 are not 180° apart on fie core member 18, but approximately 86° in the preferred embodiment. A gap 36 exists at the armature polycoil loop portion 30. In the preferred embodiment, the gap 36 is an air gap which provides additional surface area exposed to the cooling of the armature polycoil. However, depending upon the particular application, the gap 36 may be filled with insulation, such as a foam or other substance, which serves to thermally insulate one-half of the split-loop portion from the other.

Figure 4:
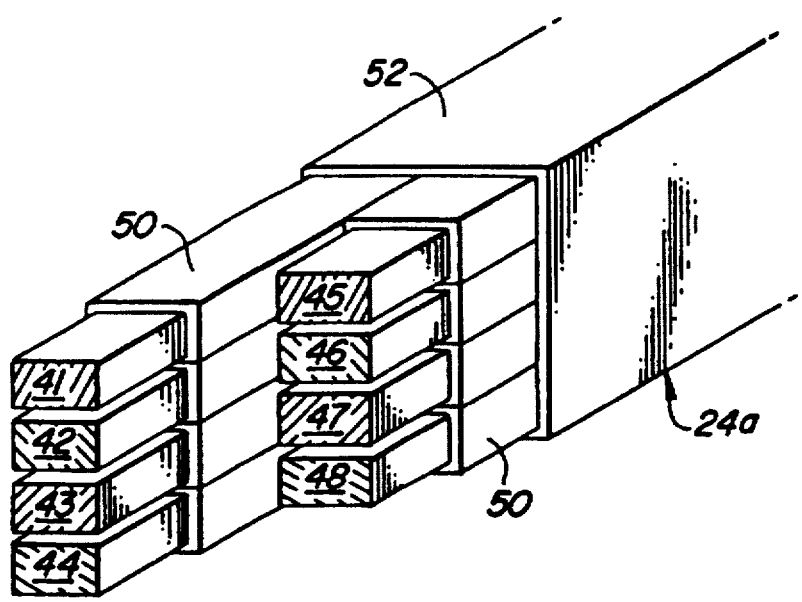
FIG. 4 is an enlarged perspective view and partial cross-sectional view taken across the lines 4—4 of FIG. 3, showing the individual conductors comprising one side of the middle portion of the armature coil.

FIG. 4 is an enlarged perspective view and partial cross-sectional view taken across the lines 4—4 of FIG. 3, showing the individual conductors comprising one side portion 24a of the middle portion of the armature polycoil 22. As can be seen from FIG. 4, each armature polycoil 22 is comprised of a number of individual parallel conductors electrically insulated from each other. In the preferred embodiment, eight conductors 41–48 are grouped or arranged into a 2×4 rectangular array at the side portions 24a and 24b. However, as will be seen below, this 2×4 array is split into two columns of 1×4 rectangular arrays at the loop portion 30.

In the preferred embodiment, each of the eight conductors 41–48 are constructed of a copper bar or wire having cross-sectional dimensions of approximately 0.15 inches× approximately 0.243 inches. Each individual conductor has insulation 50 over substantially its entire length, except at the distal end portions 26 which will be electrically connected to the commutator 28. The insulation used is a polyimide film having a total thickness of approximately 0.004 inches per side, such that the overall dimensions of the 2×4 conductor array are approximately 0.502 by 0.632 inches. The side portions 24a and 24b are bundled together with insulation 52 to form a single group of eight conductors. In the preferred embodiment, this is accomplished using an insulating tube with glass tape having a thickness of approximately 0.013 inches per side. Accordingly, the overall width of the side portion 24a is approximately 0.534 inches, while its depth is approximately 0.664 inches.

Preferably the eight individual conductors are selectively joined (41–42; 43–44; 45–46; and 47–48) at the distal ends to comprise four individual coils.

Figure 5:
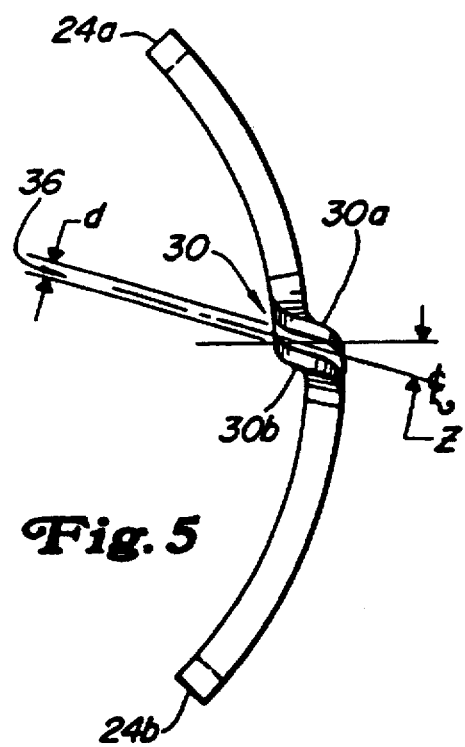
FIG. 5 is an end view of the armature coil taken in the direction of lines 5—5 of FIG. 3, wherein the loop portion is shown.

FIG. 5 is an end view of the loop portion 30 of the armature polycoil 22 taken in the direction of lines 5—5 of FIG. 3, wherein the split-loop configuration is shown in detail. By referring to FIGS. 3 and 5, it can be seen that the split-loop armature polycoil configuration has the air gap 36 in the loop portion 30 of each armature polycoil 22. The width of this air gap 36 between two groups of conductors 30a and 30b at the loop portion 30, as measured at the widest point "d" of the air gap, is at least as wide as the width of any one of the parallel individual conductors 41–48. In the preferred embodiment, the width of one of the insulated individual conductors is approximately 0.25 inches, and the air gap 36 existing between the conductors at the loop portion 30, which has varying distances, as measured at the widest point of the air gap, is approximately 0.25 inches.

In FIG. 5, note that the loop portion 30 is split into two loops 30a and 30b along a center line which is offset by an angle "z" of approximately 15° from the center line representing the radius of the rotor. In other words, as best seen in FIG. 3, the plane in which the air gap 36 lies is not exactly perpendicular to the plane in which the side portions 24a and 24b lie. This 15° loop offset allows the loop portion 30 to be formed without sharp bends, thus providing additional protection against breaks in the insulation 50.

Figure 6:
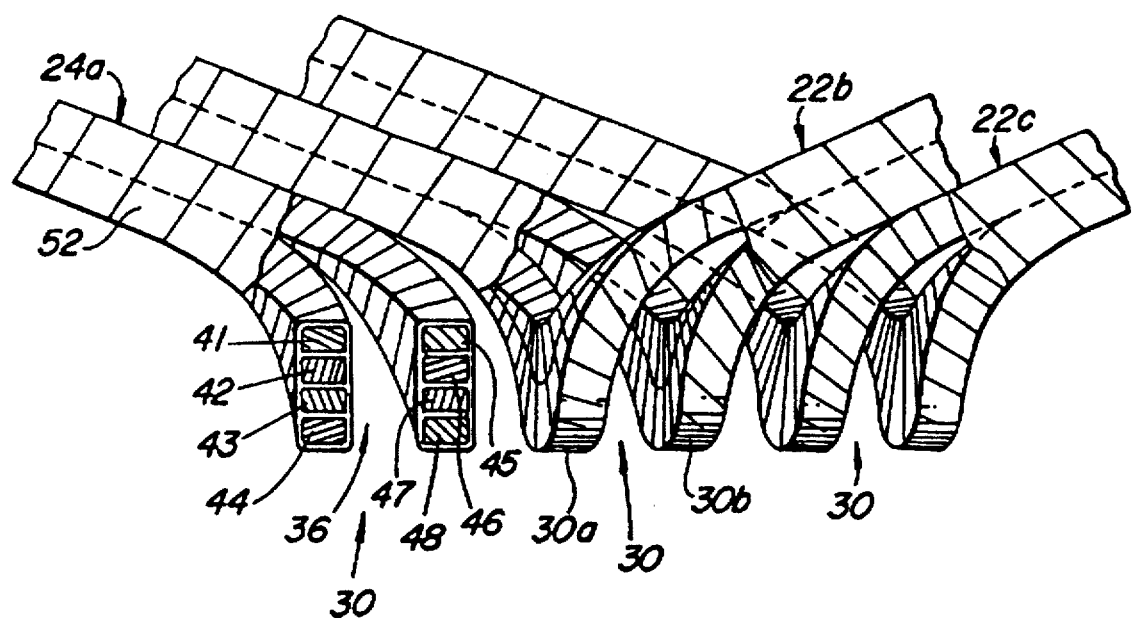
FIG. 6 is an enlarged perspective view and partial cross-sectional view of the split-loop armature coil configuration of the present invention.

FIG. 6 is an enlarged perspective view of three of the split-loop armature polycoil loop portions 30 where an armature polycoil side 24a is shown in a partial cross-sectional view. The single group of eight conductors 41–48 has been split into two groups of four conductors 41–44 and 45–48 at the loop portion 30. Each four-conductor split-loop portion 30a and 30b is individually taped or insulated apart from the other, such that an air gap 36 exists between the split-loop portions 30a and 30b.

Due to the presence of the air gap 36 between the split-loop armature polycoil loop portions 30a and 30b, additional surface area is exposed to the air for purposes of improved cooling of the armature polycoil. Since the loop portion 30 of the armature polycoil is typically a temperature hot spot, the addition of the air gap 36 significantly improves the heat dissipation capability, and thus the current-carrying capability, of the armature polycoil. Furthermore, the split-loop armature polycoil configuration also reduces the pinch points on the insulation between the conductors at the loop portion 30, particularly for the conductors 41 and 45 which form the inside-bend of the loop portion. This reduces the probability of electrical shorts caused by the manufacturing process when the armature polycoils are formed and/or due to in-service temperature and rotating dynamic conditions.

In review, it can now be seen that the split-loop armature polycoil configuration of the present invention provides advantages that were not heretofore realized in the prior art. The present invention provides an improved armature polycoil configuration having decreased temperature, particularly at the loop portion or hot spot of the polycoils. The invention is particularly adapted for dynamoelectric machines utilizing single-turn armature polycoils. Moreover, the present invention provides an improved armature polycoil configuration which reduces pressure points on the armature polycoil insulation between the individual conductors in the loop portion 30 of the polycoil.

FIG. 7a is a sectional side view of a stator polycoil for use in an AC motor of the present invention, and FIG. 7b is an end view of the stator polycoil taken in the direction of lines 7b—7b of FIG. 7a. The single turn stator polycoil 32 has a loop portion 112 analogous to loop portion 30 of FIGS. 1–6, two side portions 114, each disposed below the surface of the stator in its individual core slots 34, and distal ends 110 connected to electric circuits (not shown). FIG. 7a does not necessarily represent a planar cross-section of the stator because the side portions 114 of a polycoil 32 are typically less than 180 mechanical degrees apart. A gap 116 exists at the stator polycoil loop portion 112. The gap is preferably an air gap, but the gap may be filled with an insulative material if desired. The dimensions of the air gap and individual conductors can be the same as those discussed with respect to FIGS. 5 and 6.

Figure 8A:
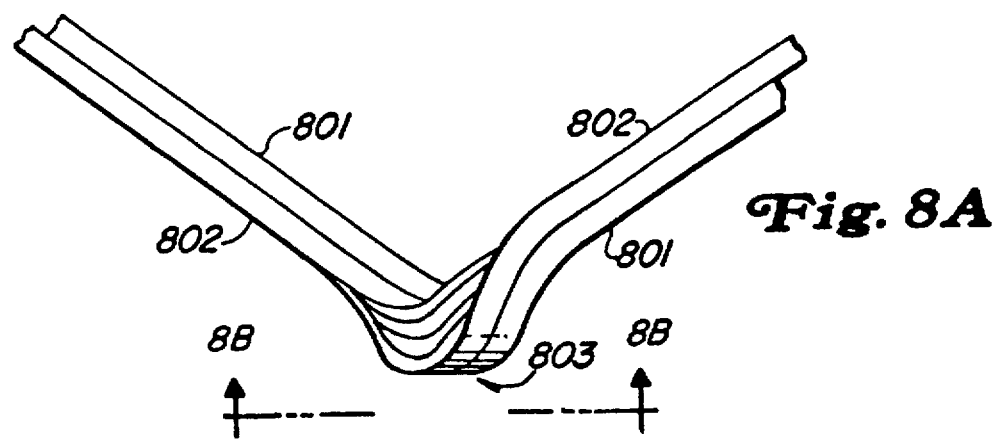
FIGS. 8a–8e are views of steps in a process for bending a coil to form a loop portion with a gap between selected individual conductors.
Figure 8B:
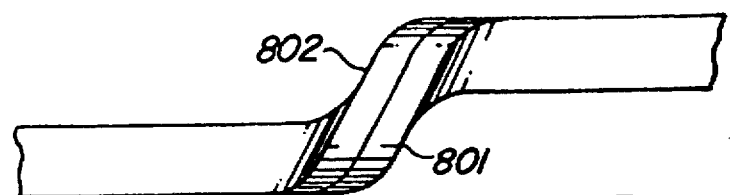

FIGS. 8a–8e are views of steps in a process for bending a polycoil to form a loop portion with a gap between selected individual conductors. In this preferred embodiment, a number N of pairs of straight insulated wires are assembled in a bundle array of 2×N wires. FIG. 8a is a view of a loop end portion 803 of the armature polycoil before any gap has been formed. In this embodiment an initial step in forming air gap 30 of FIGS. 1–6 or air gap 116 of FIGS. 7a and 7b between the two polycoil loop portions involves simultaneously bending the bundle array of wires comprising a first portion 801 of the armature polycoil and an adjacent second portion 802 of the armature coil while simultaneously twisting the bundle between 170° and 210°. Preferably the bundle is twisted about 180°. First portion 801 may comprise, for example, a first set of the individual conductors 41, 42, 43, and 44 (shown in FIG. 4) in a one-dimensional stack, and second portion 802 may comprise, for example, a second set of the individual conductors 45, 46, 47, and 48 (shown in FIG. 4) in a one dimensional stack. After the first and second portions are bent and twisted, no air gap exists, as shown in FIG. 8a and FIG. 8b, which is an end view of the first and second portions taken in the direction of lines 8b—8b of FIG. 8a.

Figure 8C:
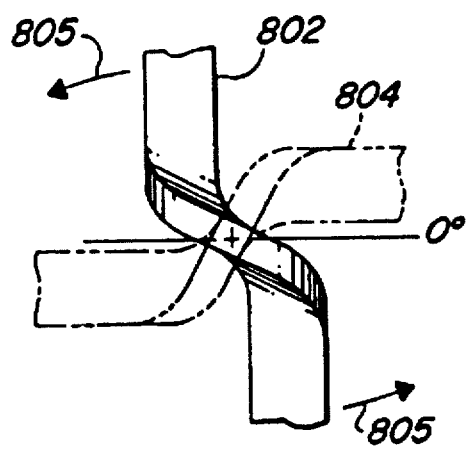
Figure 8D:
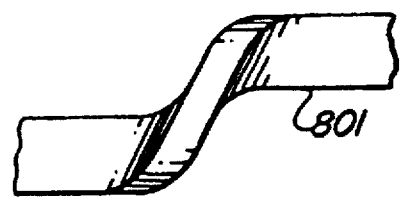

As shown in FIG. 8c, one of the first and second portions (in this example second portion 802) is lifted away from the other and rotated approximately 180°. In FIG. 8c this rotation is shown as counter clockwise about the bend as shown by directional arrows 805. The direction can alternatively be clockwise if desired. The original position of second portion 802 is shown by phantom lines 804, and the position of second portion 802 is shown at about 90° (half way) into the 180° rotation. Meanwhile, the first portion 801 remains in its original orientation, as shown in FIG. 8d. Either before or after the rotation, each of the first and second portions is further insulated in a respective loop portion, for example, by binding each loop portion with insulative tape.

Figure 8E:
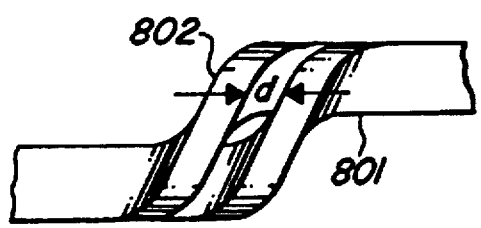

To form the air gap after one of the first and second portions has been rotated, the two portions are positioned substantially adjacent to each other. In FIG. 8e, the rotated second portion 802 is shown as positioned over first portion 801 so as to form a gap between the first and second portions at loop end portion 803 and so as to situate the first and second portions substantially parallel with one another at their middle portions which will be inserted into rotor or stator slots. Alternatively, first portion 801 can be positioned over the rotated second portion 802.

This technique is advantageous because only one bending machine is required for loop end portion fabrication so that all individual conductors are bent and twisted simultaneously, and because the process yields an armature polycoil with an air gap distance "d" every time which, at its widest point, is approximately the width of the individual conductors. After the two portions are positioned adjacent each other, further bending is used to form an armature polycoil which can be inserted into either the rotor or stator slots.

While specific embodiments of the present invention have been shown and described herein, further modifications and improvements may be made by those skilled in the art. For example, the split-loop armature polycoil configuration of the present invention may be used with any type of dynamoelectric machine, such as, for example, DC motors, AC generators, etc. Furthermore, the particular array configurations and conductor dimensions of the preferred embodiment could readily be modified for different machines and/or different applications. All such modifications which retain the basic underlying principles disclosed and claimed herein are within scope of this invention.

What is claimed is:

1. A method for forming a polycoil including identical first and second sets of a plurality of individual conductors, the polycoil comprising a loop end portion and two middle portions each connected to the loop end portion for placement in two respective longitudinal slots of a magnetizable core member of a dynamoelectric machine, the method comprising the steps of:
   bending and twisting the first set of the plurality of individual conductors;
   bending and twisting the second set of the plurality of individual conductors;
   rotating one of the first and second sets approximately 180 degrees relative to the other set; and
   positioning the first and second sets, with one rotated 180 degrees, substantially adjacent so as to form a gap between the first and second sets at the portions of the first and second sets which were bent and twisted to form the loop end portion of the polycoil and so as to situate the first and second sets substantially parallel without a gap between the first and second sets over the middle portions of the polycoil.

2. The method of claim 1 wherein bending and twisting the first set of the plurality of individual conductors and bending and twisting the second set of the plurality of individual conductors occur simultaneously, and wherein the first and second sets are twisted between 170 degrees and 210 degrees.

3. The method of claim 2, further including the step of electrically insulating each of the plurality of individual conductors in the areas of the first and second sets which were bent and twisted.

4. The method of claim 3, wherein the step of positioning the first and second sets substantially adjacent so as to form a gap comprises forming a gap having varying distances, including a widest distance between the first and second sets which is at least as wide as fie width of any one of the plurality of individual conductors.

5. The method of claim 4, wherein each set of individual conductors comprises one 1×4 array of electrical conductors.

6. A method for forming a coil including identical first and second sets of a plurality of individual insulated conductors, the coil comprising a loop end portion and two middle portions each connected to the loop end portion for placement in two respective longitudinal slots of a magnetizable core member of a dynamoelectric machine, the method comprising the steps of:
   bending and twisting the first set and the second set of the plurality of individual insulated conductors, each of the first and second sets comprising a one dimensional stack of selected ones of the plurality of electrical conductors;
   rotating one of the first and second sets approximately 180 degrees relative to the other set; and
   positioning the first and second sets, with one rotated 180 degrees substantially adjacent so as to form a gap between the first and second sets at the portions of the first and second sets which were bent to form the loop end portion of the coil and so as to situate the first and second sets substantially parallel without a gap between the first and second sets over the middle portions of the coil.

* * * * *